UNITED STATES PATENT OFFICE.

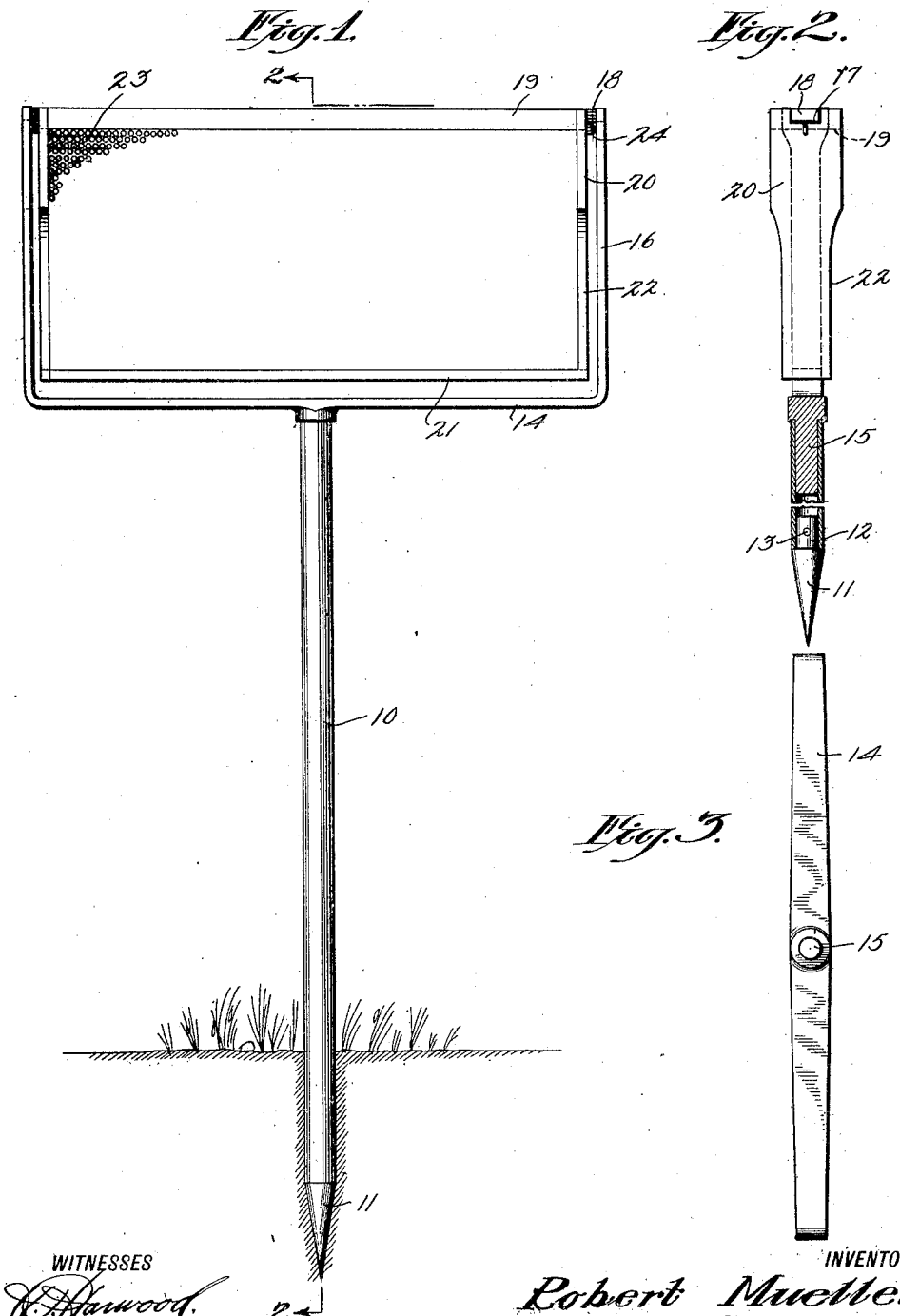

ROBERT MUELLER, OF YONKERS, NEW YORK.

HONEY-BEE-FRAME INSPECTION-STAND.

1,363,149.  Specification of Letters Patent. Patented Dec. 21, 1920.

Application filed January 16, 1920. Serial No. 351,819.

*To all whom it may concern:*

Be it known that I, ROBERT MUELLER, a citizen of the United States, and a resident of Yonkers, county of Westchester, and State of New York, have invented a new and Improved Honey-Bee-Frame Inspection-Stand, of which the following is a full, clear, and exact description.

This invention relates to honey bee frame inspection stands, and has reference more particularly to an inspection stand of the class indicated which is adapted to be thrust into the ground at any convenient place, and is also adapted to support the honey bee brood frame.

An object of this invention is to provide an inspection stand of the class described which will be simple and inexpensive to manufacture, and very convenient to use.

Reference is to be had to the accompanying drawing forming a part of this specification, in which it is understood that the drawing is merely illustrative of one form of the invention, and in which—

Figure 1 is an elevation of the inspection stand showing a honey bee brood frame in position.

Fig. 2 is a section through Fig. 1 on the line 2—2.

Fig. 3 is a bottom view of the pivoted frame support removed from the supporting stand.

Referring to the accompanying drawing by numerals, 10 indicates any suitable supporting means which preferably takes the form of a tube which is provided at one end with a point 11, having a section 12 of a diameter such that said section may be inserted inside said tube and be made fast therein by means of a pin 13. This point 11 is provided so that the tube 10 may be thrust into the ground at any convenient place so as to provide a supporting means for a honey bee frame. A supporting frame 14 is preferably U-shaped and is provided with a downwardly extending section 15 having a diameter such that said section may be inserted in the upper end of the pipe 10, and will be loosely fitted therein so that said inspection frame support may be turned at any convenient angle (preferably toward the light). The upper end of each leg 16 of the support is preferably provided with a recess 17 into which may be placed a lug 18 of a top bar 19 which is usually found on the commercial honey bee brood frame. This honey bee frame also includes side members 20 and a bottom member 21, and a large number of these frames are placed edge to edge in a bee hive with the lugs 18 resting on longitudinal cleats, not shown, in the bee hive. The lower ends of the side members 20 are offset at 22 so that when the frames are placed edge to edge in the bee hive, the bees may enter between said frames and form the cells 23 of wax in which are contained the eggs, honey, and young bees. These frames require frequent inspection, as the bees sometimes get diseases, and the frame support 14 provides a convenient means for supporting the brood frames while they are inspected and treated for these diseases. Any stop such as a staple 24 is fixed to the side members 20 of the frame which serves to prevent longitudinal movement of the frame between the legs 16 of the frame support 14.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a honey bee frame inspection stand, a tubular standard, a point provided on one end of said standard, and a U-shaped frame support pivotally mounted on the other end of said standard, said support being provided with a recess at the upper end of each leg, said recess serving to receive a portion of the honey bee frame and support said frame thereby.

2. In a honey bee frame inspection stand, a tubular standard, a point provided on one end of said standard, and a U-shaped frame support pivotally mounted on the other end of said standard, said support being provided with a recess at the upper end of each leg, said recesses serving to receive a portion of the honey bee frame and support said frame thereby, stops carried by the honey bee frame and abutting against the legs of the U-shaped support, preventing a longitudinal movement of the frame within the support.

3. In a device of the character stated, a hollow upright standard, a U-shaped support, a depending annular extension on the support turnable in the upper end of the hollow standard, the upper end of each leg of the support being bifurcated to receive a lug on a honey bee frame, and means preventing longitudinal movement of the frame within the support.

ROBERT MUELLER.